April 9, 1963 O. J. M. SMITH 3,084,859
NUMBER STORAGE APPARATUS AND METHOD
Filed June 14, 1957 5 Sheets-Sheet 1

INVENTOR.
Otto J. M. Smith
BY Flehr & Swain
ATTORNEYS

INVENTOR.
Otto J. M. Smith
BY Flehr and Swain
ATTORNEYS

April 9, 1963 O. J. M. SMITH 3,084,859

NUMBER STORAGE APPARATUS AND METHOD

Filed June 14, 1957 5 Sheets-Sheet 3

INVENTOR.
Otto J. M. Smith
BY [signature]
ATTORNEYS

April 9, 1963 O. J. M. SMITH 3,084,859
NUMBER STORAGE APPARATUS AND METHOD
Filed June 14, 1957 5 Sheets-Sheet 4

INVENTOR.
Otto J. M. Smith
BY Fehr and Swain
ATTORNEYS

April 9, 1963

O. J. M. SMITH 3,084,859

NUMBER STORAGE APPARATUS AND METHOD

Filed June 14, 1957

5 Sheets-Sheet 5

INVENTOR.
Otto J. M. Smith

BY

Flehr and Swain

ATTORNEYS

United States Patent Office 3,084,859

Patented Apr. 9, 1963

3,084,859

NUMBER STORAGE APPARATUS AND METHOD

Otto J. M. Smith, Contra Costa County, Calif.
(612 Euclid Ave., Berkeley, Calif.)

Filed June 14, 1957, Ser. No. 665,762
28 Claims. (Cl. 235—92)

This invention relates to a number storage apparatus and method which gives a response in accordance with input pulses or events and more particularly relates to number registers, scalers, counters and other similar types of apparatus.

One type of scaler used in the past incorporated an Eccles-Jordan or flip-flop circuit in conjunction with a binary system for counting purposes. However, in view of the wide preference for decimal rather than binary dividing ratios, compounded binary systems have been utilized by modifying them with a feedback circuit to recycle after each tenth triggering pulse applied. Such a system, however, has been found to have several inherent disadvantages which make it difficult to utilize such a system in conjunction with scaling at high rates. In particular, the delays between switching from one flip-flop circuit to the next and the delay in the feedback or triggering circuit are appreciable and prevent the system from being utilized for scaling at high rates.

In order to develop a scaler suitable for high rates, it has been proposed that a frequency shift scaler be utilized. However, upon investigation it has been found that frequency shift scalers also have several serious disadvantages. For example, a multiple frequency oscillator is required in which the condition for oscillation is different for every frequency and for that reason, the speed of triggering, the ease of triggering and the probability of the counter staying in any one stable state are significantly different for the other different states. Furthermore, as such a large number of stable states requires a large number of different oscillation frequencies, the band width required for a frequency shift scaler is excessive. Similar disadvantages are often encountered in number registers or number storage devices because a scaler is but one special application of a number storage device.

In general, it is an object of the present invention to provide a number storage apparatus and method which does not have the above named disadvantages.

Another object of the invention is to provide a number storage apparatus and method which is particularly adaptable for scaling at high rates.

Another object of the invention is to provide a number storage apparatus and method in which the stable states require the same conditions for oscillation and for that reason have the same probability of oscillation for each state.

Another object of the invention is to provide a number storage apparatus and method in which a relatively narrow band width is required.

Another object of the invention is to provide a number storage apparatus and method of the above character in which narrow band coupling is required between stages.

Another object of the invention is to provide a number storage apparatus and method of the above character in which the memory is in the form of the phase of an electromagnetic wave which can exist in a wave guide or cavity.

Another object of the invention is to provide a number storage apparatus and method of the above character in which different wave forms may be utilized.

Another object of the invention is to provide a number storage apparatus and method of the above character in which the reference oscillator frequency is not introduced into every stage.

Another object of the invention is to provide a number storage apparatus and method of the above character in which the successive stages operate at successively lower oscillation frequencies.

Another object of the invention is to provide a number storage apparatus of the above character in which the various stages operate at frequencies which are scaled down in the same ratio as the scaling factors applied to the pulses which are counted.

Another object of the invention is to provide a number storage apparatus of the above character in which nonlinear gates are not required except in the first stage.

Another object of the invention is to provide a number storage apparatus of the above character in which no non-linearity of any type is required except for the synchronizing characteristic of the variable phase oscillator.

Another object of the invention is to provide a number storage apparatus and method of the above character in which no clipping is required.

Another object of the invention is to provide a number storage apparatus and method of the above character in which symmetry is present in that each stage of the phase shift scaler has two oscillators which can be identical in nature.

Another object of the invention is to provide a number storage apparatus of the above character in which the number of tubes required is substantially reduced.

Another object of the invention is to provide a number storage apparatus and method of the above character in which a number may be stored.

Another object of the invention is to provide a number storage apparatus and method of the above character in which adding and subtracting can be carried on.

Another object of the invention is to provide a number storage apparatus and method of the above character which can be used in digital computers.

Additional objects and features of the invention will appear from the following description in which the preferred embodiment has been set forth in detail in conjunction with the accompanying drawing.

Referring to the drawing.

The present invention is characterized by the use of novel means for creating a phase shift between one voltage and two other voltages wherein the amount of the phase shift is determined by the number of pulses or events scaled or counted. Novel means is also utilized for measuring the phase shift to give a read-out and also to produce a pulse at the instant the phase of one of the voltages is coincident with the phases of the other two voltages to actuate a succeeding stage. The present invention is also characterized by the use of novel means for storing numbers and for adding and subtracting numbers.

Figure 1:
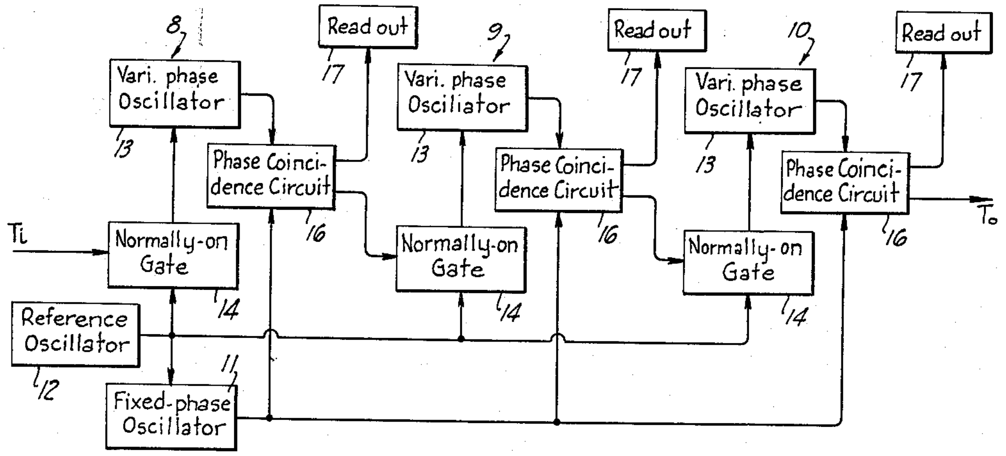
FIGURE 1 is a block diagram of a number storage apparatus incorporating my invention utilized as a phase shift scaler.

A block diagram of one embodiment of my invention utilized as a phase shift scaler is shown in FIGURE 1 and is comprised of three stages 8, 9 and 10, however, additional or fewer stages may be utilized if desired. A fixed phase oscillator 11 operating at a predetermined frequency which will be denoted by "$f$" supplies each of the stages. A precision reference oscillator 12 operates at a frequency which is a multiple of the predetermined frequency of the fixed phase oscillator 11 and also supplies each of the stages. This frequency will be termed "$nf$" wherein "$n$" is the number of stable states desired per stage as hereinafter described. This reference frequency "$nf$" can be obtained from a harmonic of the fixed phase oscillator 11 or can be obtained from a separate precision oscillator 12 as shown in the block diagram. The precision oscillator 12 provides a synchronizing frequency to hold the fixed phase oscillator 11 firmly in synchronism with it. Both the fixed phase oscillator 11 and the reference oscillator 12 are well known in the art and will not be described in detail. They merely consist of very stable oscillators operating at a fixed frequency.

Each of the stages also consists of a variable phase oscillator 13 which operates at substantially the same frequency as the predetermined frequency of the fixed phase oscillator. The variable phase oscillator is of the type which is capable of being synchronized and which will change its frequency and phase rather rapidly. Oscillators of this type are also well known in the art and are characterized by the fact that they generally have a low Q and poor frequency stability.

The synchronizing frequency "$nf$" from the reference oscillator 12 is connected to a normally closed circuit or open gate 14 which is connected to the variable phase oscillator 13. Thus, when the gate 14 is open, the synchronizing frequency "$nf$" passes into the variable phase oscillator 13 and holds it in synchronism with the fixed phase oscillator 11 but with an unknown phase relationship between the variable phase oscillator and the fixed phase oscillator.

The gate 14 is also constructed in a manner well known to those skilled in the art. For example, it can consist of a pair of diodes (manufacturer's No. 1N99) arranged back to back as hereinafter described.

The wave forms or events to be scaled or counted are denoted as $T_1$ and are fed into the gate 14. The wave forms act as trigger pulses and serve to trigger the gate to an off or closed position. This removes the synchronizing frequency from the variable phase oscillator 13 and permits the variable phase oscillator to operate at its free running frequency.

The free running frequency of each variable phase oscillator is normally adjusted to approximately $f(1-\frac{1}{3}n)$. This permits the fastest possible scaling or counting rate. If a larger frequency deviation were permitted the variable phase oscillator might lock into a different frequency. When the gate 14 is open or in a closed circuit condition, the injected synchronizing frequency pulls this free running frequency up to "$f$," the predetermined frequency of the fixed phase oscillator 11. As soon as the gate 14 is closed or placed in an open circuit condition by an event or pulse, the variable phase oscillator 13 shifts to $f(1-\frac{1}{3}n)$. At this frequency, the counting oscillator loses phase at the rate of $120/n$ degrees per cycle of oscillation. As pointed out above, there are restrictions on the maximum permissible frequency drift of the variable phase oscillator which is dependent upon the scaling factor. For example, with a scale of 10, the unsynchronized frequency drift should not exceed one-half of one percent.

It is well known that the difference between the free running frequency of the variable phase oscillator 13 and the synchronized frequency of the fixed phase oscillator 11 is a measure of the rate of change of phase between the two oscillators. If the gate 14 stays closed for a sufficient time, the variable phase oscillator 13 will have changed its phase by a sufficient amount so that when gate 14 again opens, the counting oscillator 13 will lock into synchronism with the fixed phase oscillator 11 with a new relative phase relationship.

For example, as stated above, if the counting oscillator is adjusted so that it shifts to $f(1-\frac{1}{3}n)$ when the gate 14 is closed, the counting oscillator loses phase at the rate of $120/n$ degrees per cycle of oscillation. The phase of the next count should be $360/n$ degrees behind, which should require exactly three cycles of oscillation at the free running frequency. Each trigger pulse or event $T_1$ should therefore open the synchronizing gatee 14 for $3/f$ seconds. The maximum possible trigger ratee would be $f/3$ cycles per second. This maximum scaling or counting rate is independent of the scaling ratio whether the scaling ratio be 100 states per stage for a high ratio counter or only 2 states per stage for a binary counter. The counting rate is a function only of the counter frequency.

To measure the phase relationship between the counting oscillator 13 and the fixed phase oscillator 11, a phase coincidence circuit 16 is provided. The phase coincidence circuit 16 in the simplest form can consist of circuitry which reaches a precise null or a maximum value at the instant the variable phase oscillator 13 and the fixed phase oscillator 11 are exactly in phase. However, in order to start the counting or scaling sequence at a predetermined known phase relationship between the variable phase oscillator and the fixed phase oscillator, means must be provided so that the output of the variable phase oscillator and the fixed phase oscillators are connected together so that their phases are identical for the zero count. Such means is well known in the art and, for example, consists of a push button which connects the grids or plates of the two oscillators together at the same time. It will be noted from the block diagram that the fixed phase oscillator 11 determines the phase for the zero count for each of the stages.

Since the reference oscillator 13 has a frequency $n$ times as large as $f$ there are $n$ possible different phases of oscillation of the variable phase oscillator 13 with respect to the fixed phase oscillator 11 and for that reason there are $n$ counts available per stage. In order to couple one stage to the next succeeding stage, the phase coincidence circuit 16 must deliver a short pulse corresponding to the instant when the variable phase oscillator 13 and the fixed phase oscillator 11 come into coincidence. This short pulse which can be termed $T_0$ is used to trigger off or closed the synchronizing gate of the following or succeeding stage. With a coincidence circuit of this type, $n$ counts of the first stage can be used to produce one count of the succeeding stage.

Figure 2:
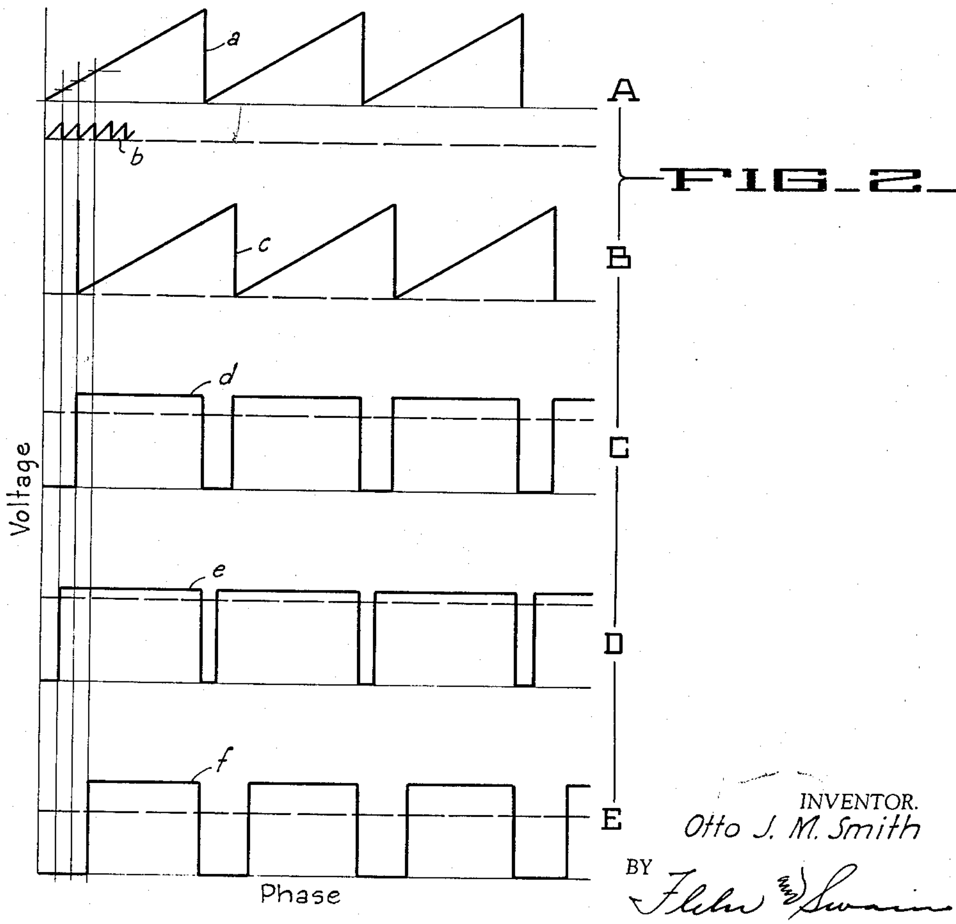
FIGURE 2A represents the output of one type of fixed phase oscillator.
FIGURE 2B shows a curve which represents the output of one type of variable phase oscillator.
FIGURES 2C, 2D and 2E are curves which show the relative phase and voltage relationships which are available for the different numbers of counts.

In FIGURE 2A I have shown the output curves $a$ and $b$ which are saw tooth waves for the fixed phase oscillator 11 and the reference oscillator 12, respectively, and in FIGURE 2B I have shown the output curve *c* which is a sawtooth wave for the counting or variable phase oscillator 13. The two curves shown in FIGURES 2A and 2B show the wave shapes delivered by each of the oscillators with reference to each other for the particular case of the count of two. FIGURES 2C, 2D and 2E show relative phases and voltages which are available for different numbers of counts and which are persented to the readout device. For example, FIGURE 2C shows a curve *d* which is curve *a* minus curve *c*. Curve *d* shows the relative phases and voltages for the count of 2. Curve *e* in FIGURE 2D shows the relative phases and voltages for the count of 1, and curve *f* in FIGURE 2E shows the relative phases and voltages for the count of 3.

The readout device 17 has presented to it a voltage which is the difference between the output of the fixed phase oscillator 11 and the output of the variable phase oscillator 13. This voltage is the curve *a* minus curve *c*. The zero lines in these curves represent zero voltage. This difference is shown in curve *d* in FIGURE 2C, from which it can be seen that at zero input time, curve *d* has a negative value of 8 units which lasts for 2 units of time where each unit of time is considered to be one full cycle of the frequency of the reference oscillator 12. At the end of two units of time, the curve *d* increases positively by 10 units magnitude and, therefore, goes from —8 units voltage to +2 units voltage. The +2 units voltage lasts for 8 units of time after which it again goes to —8 units voltage. It, therefore, can be seen that each portion of the curve *d* above and below the zero voltag eline is equal to 2×8 or 16 units positive and 16 units negative. However, the significant information is not carried by the area of the voltage curve but by its peak positive value and in this particular case the peak positive value is 2 units. For the particular case when the variable phase oscillator 13 is in phase with the fixed phase oscillator 11, the two output voltages are identical and the difference is equal to zero and, therefore, zero volts are presented to the readout 17.

Curve *e* in FIGURE 2D shows the case when the variable phase oscillator 13 is lagging behind the fixed phase oscillator 11 by 36°. The time lag of the variable phase oscillator 13 is one unit of time, and the difference between the output of the fixed phase oscillator 11 and the output of the variable phase oscillator 13 is the curve *d*. This curve has a maximum positive value of 1, and a maximum negative value of —9. This represents a count of one.

Curve *f* in FIGURE 2E gives the difference between the output of the fixed phase oscillator 11 and the variable phase oscillator 13, when the variable phase oscillator is lagging the fixed phase oscillator by three times 36° or 108°. This represents a count of three. The wave shape is such that it has a positive maximum value of 3 and a negative maximum value of —7.

Now, if it is assumed that a peak reading voltmeter is used as the readout device 17 to measure only the positive peak value of the wave delivered at the output of the phase coincidence circuit or subtractor 16, this voltmeter would read numbers from 0 to 9 corresponding respectively to the ten successive phase states of the variable phase oscillator 13 as it starts out first in a condition in which it is in phase with the fixed phase oscillator and then for each successive phase state, it lags 36° behind the previous phase state.

Figures 3, 4:
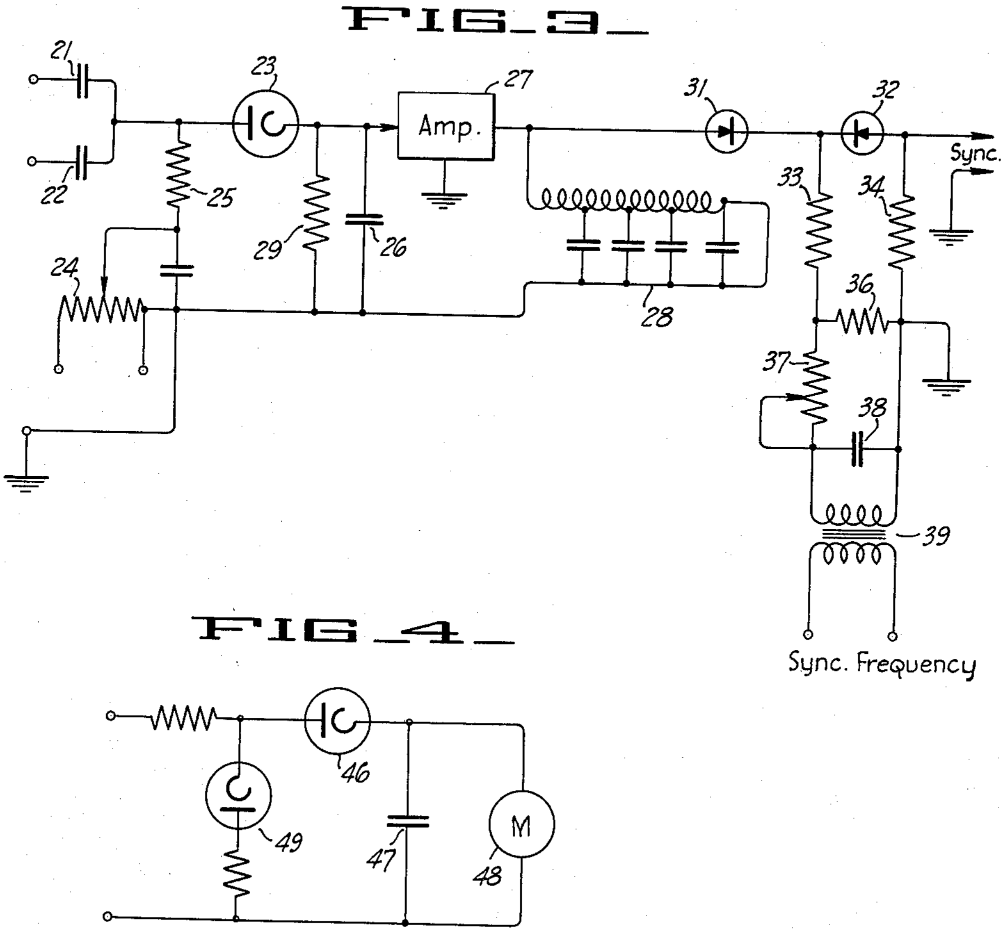
FIGURE 3 is a circuit diagram of a phase coincidence circuit.
FIGURE 4 is a circuit diagram of one type of readout.

In FIGURE 3 I have shown a specific example of a phase comparison or coincidence circuit which can be used to deliver a trigger pulse to the succeeding stage and which would be suitable for low frequency scaling. Assuming that the outputs from the variable phase oscillator 13 and the fixed oscillator 11 are in the form of saw-tooth waves, the saw-tooth waves from the fixed phase oscillator are fed through the coupling capacitor 21 and the saw-tooth waves from the variable phase oscillator are fed through the coupling capacitor 22. Both the waves are then fed into a rectifier or diode 23. The diode 23 is biased to a significantly large value by the potentiometer 24 and resistor 25 so that the diode conducts only for the condition in which the outputs of the fixed phase oscillator and the variable phase oscillators are exactly in phase. Resistor 25 introduces a fixed bias on the diode 23 to prevent it from conducting until the input voltage from the capacitors 21 and 22 exceed the bias value. The opposite ends of the potentiometer 24 are connected to suitable power supply (not shown).

When the outputs of the fixed phase and variable phase oscillators are exactly in phase, the diode 23 conducts and charges up the capacitor 26. The sudden rise in voltage across the capacitor 26 is amplified by an amplifier 27 and impressed across a shorted transmission line 28 of a type well known to those skilled in the art. The voltage across the shorted transmission line 28 can exist only for the time it takes the transient to propagate down to the short circuited end of the transmission line and back again and for that reason a step function of voltage across the capacitor 26 will cause a short pulse across the input of the shorted transmission line 28. This short pulse is of sufficient duration so that it will properly operate the gate of the succeeding stage. Resistor 29 serves as a bleed off resistance and provides a D.-C. path for the discharge current from capacitor 26 after a pulse has terminated to place the capacitor 26 in an uncharged condition for the receipt of the next pulse from diode 23.

The gate as shown in FIGURE 3 consists of a pair of diodes 31 and 32 arranged back to back. A network consisting of resistors 33, 34 and 36, a potentiometer 37, a resonating capacitor 38 and a transformer 39 is connected across the diode 32. When the gate consisting of diodes 31 and 32 is open or normally on, diode 32 is conducting. The synchronizing frequency which appears at the secondary of the transformer 39 is impressed across the resistor 36 and is also impressed across the series combination of resistor 33, diode 32 and resistor 34. The current which flows through these three components in series produces a voltage drop across resistor 34 which is approximately one-half of the voltage across the secondary of the transformer 39. This value is impressed across the synchronizing circuit of the variable phase oscillator of the following stage.

At the instant the transmission line 28 has a pulse propagating in it, there is a positive voltage at the output of the amplifier 27 and a positive voltage impressed across the diode 31 with respect to ground. Diode 31 therefore conducts current and the positive voltage which it carries passes through the resistor 33 and through the resistor 36 to ground. This large positive voltage biases diode 32 to cut off. Since no current can flow through diode 32, the synchronizing frequency is completely removed from the synchronizing circuit and the variable phase oscillator is free running for the time of duration of the trigger pulse across the gate.

The potentiometer 37 provides means for adjusting the amplitude of the synchronizing frequency impressed across the synchronizing circuit. If the magnitude of the synchronizing frequency were too large, it might be difficult to obtain satisfactory triggering from one stable state to the next. If the magnitude were too small, the variable phase oscillator 13 may not pull into synchronism sufficiently fast after triggering and thus may jump two stable states for each input pulse.

It is readily apparent that the above phase coincidence circuit will cause production of a short pulse of a predetermined length each time the phases of the fixed phase and the variable phase oscillators come into coincidence.

Suitable readout means is provided in each stage for measuring the difference between the phase of the variable phase oscillator 13 and the fixed phase oscillator 11. If, for example, the variable phase oscillator 13 and the fixed phase oscillator 11 are saw-tooth oscillators, the readout circuit can be of the type shown in FIGURE 4. It consists of a diode 46 across which is applied the difference between the variable phase oscillator and the fixed phase oscillator. The diode serves to measure the peak magnitude of the positive half-wave only. The positive half-wave serves to charge up the capacitor 47. A meter 48 is connected across the capacitor 47 and reads the voltage across the capacitor. The meter is normally calibrated linearly in suitable units such as from 0 to 9 or from 1 to 10 and will thus give a direct output reading proportional to the number of counts for the type of system in which the variable phase and fixed phase oscillators are saw-tooth oscillators. A diode 49 shorts out the negative half cycles of the radio frequency to ground and provides symmetry for loading both half cycles. The readout circuit in FIGURE 4 thus serves to give a direct readout for saw-tooth oscillators which reading is the average rectified difference between the variable phase saw-tooth oscillator and the fixed phase saw-tooth oscillator.

If the two oscillators are of the sinusoidal type, the readout can be any adaptation of the principle of a Lissajous figure well known to those skilled in the art.

Other types of readout means can be utilized such as in decade counters of the electronic type as for example the decade counter AC–4A sold by Hewlett-Packard Company of Palo Alto, California. As is well known, such decade counters divide the applied frequency of the incoming pulses by 10 and present the lower frequency at their outputs. Suitable indicating means is associated with each of the decade counters whereby the number of input pulses received for each counter is displayed individually.

Operation of the complete apparatus illustrated in the block diagram in FIGURE 1 may now be described as follows: To facilitate description, let it be assumed that the following apparatus was utilized for the various blocks. The gate 14 consisted of a pair of germanium crystal diodes arranged back to back such as of the type denoted by manufacturer's No. 1N99. The fixed phase oscillator 11 was a saw-tooth oscillator operating at 10 kc. The reference oscillator 12 was a sinusoidal oscillator operating at 100 kc. As hereinbefore described, the synchronizing frequency of 100 kc. is normally applied through the normally open gate 14 to the variable phase oscillator 13 which was a saw-tooth oscillator operating at 10 kc.

As soon as the gate 14 is closed by a pulse or event $T_1$, the variable phase oscillator immediately drops to its free running frequency which by way of example as pointed out above, may be $f(1-\frac{1}{3}n)$ which since $n$ is equal to 10 would be approximately 9.7 kc. At this frequency, the variable phase oscillator 13 loses phase at the rate of $120/n$ or 12° per cycle of oscillation. The outputs of the variable phase oscillator 13 and the fixed phase oscillator 11 are applied to the phase coincident circuit 16.

After a predetermined interval, the gate 14 opens automatically to again apply the synchronizing frequency to the variable phase oscillator 13 to pull it into synchronism with the reference oscillator 12 with a new phase relationship between the variable phase oscillator 13 and the fixed phase oscillator 11. It has been assumed that the input pulses or events $T_1$ applied to the gate 14 have been tailored by means well known in the art to operate the gate 14 for a predetermined length of time as for example, the reflecting line 28 shown in FIGURE 3. This predetermined length of time is sufficient to permit the variable phase oscillator 13 to shift its phase by one state of the total number of possible states available in the stage. For example, when the fixed phase oscillator 11 and the variable phase oscillator 13 are operating at 10 kc. and the reference oscillator 12 at 100 kc., there are 10 possible phase states available and each input phase or event should cause the variable phase oscillator 13 to shift its phase by one state.

If the variable phase oscillator 13 has a very low Q and shifts frequency quickly, then 3 cycles of oscillation or 3 periods of time are required per count. Because the synchronizing frequency has a tendency to "pull" the synchronized frequency, a one count is obtained for all gate pulses more than one and one-half periods and less than four and one-half periods in length.

For example, if the transmission line 28 in FIGURE 3 is used for tailoring the input pulses and is one period long, the gate or input pulse will be two periods long. When the voltage across condenser 26 drops to zero, the output of the amplifier 27 has a negative pulse of two periods long. The shortest possible operating sequence would be two periods for the phase to lag behind, and two more periods for resynchronizing, making a total of 4 periods. This represents the dead time of this type of coincidence circuit.

Each time the variable phase oscillator 13 shifts to a new state, the readout circuit 17 is actuated to give an indication of the number of states through which the variable phase oscillator 13 has passed from the zero count.

When sufficient input events or pulses have been applied to the gate 14 to cause the variable phase oscillator 13 to pass through all of these states to the last state, means well known to those skilled in the art are actuated to reset the readout means to its lowest number. At this time the variable phase oscillator 13 and the fixed phase oscillator 11 will be in phase and the phase coincidence circuit 16 will cause the production of a short pulse which triggers the gate of the succeeding stage.

One phase coincidence circuit found to be satisfactory for the frequency where the fixed phase oscillator 11 and the variable phase oscillator 13 were saw-tooth oscillators and were operated at a frequency of 10 kc. and the reference oscillator 12 was a sinusoidal oscillator operated at 100 kc. had the following values for the circuit components shown in FIGURE 3:

| | |
|---|---|
| Capacitor 21 | 100 mmf. |
| Capacitor 22 | 100 mmf. |
| Resistor 24 | 25 K. |
| Resistor 25 | 25 K. |
| Capacitor 26 | 50 mmf. |
| Resistor 33 | 33 K. |
| Resistor 34 | 33 K. |
| Resistor 36 | 500 K. |
| Potentiometer 37 | 15 K. |

The amplifier had a gain of 20 db and the shorted transmission line 28 had a characteristic impedance of 400 ohms and was 150 microseconds in length, delivering a 300 microsecond pulse. The 300 microsecond pulse was equivalent to three full cycles of the 10 kc. fixed phase oscillator 11. As described previously, the pulse was of such a length that it would permit the variable phase oscillator 13 to drop back in phase $\frac{1}{10}$ of a cycle which is 36°.

It is apparent from the foregoing that my phase shift scaler and method is particularly adaptable for many different types of applications. For example, if high power is desired, thyratron decade scaler can be utilized. Neon tube scalers can also be utilized in the above method and apparatus but would probably have to be limited to binary counters because of the unreliability of the tube characteristics. By utilizing crystal controlled oscillators, scales of 10 and 100 may be used.

Figure 5:
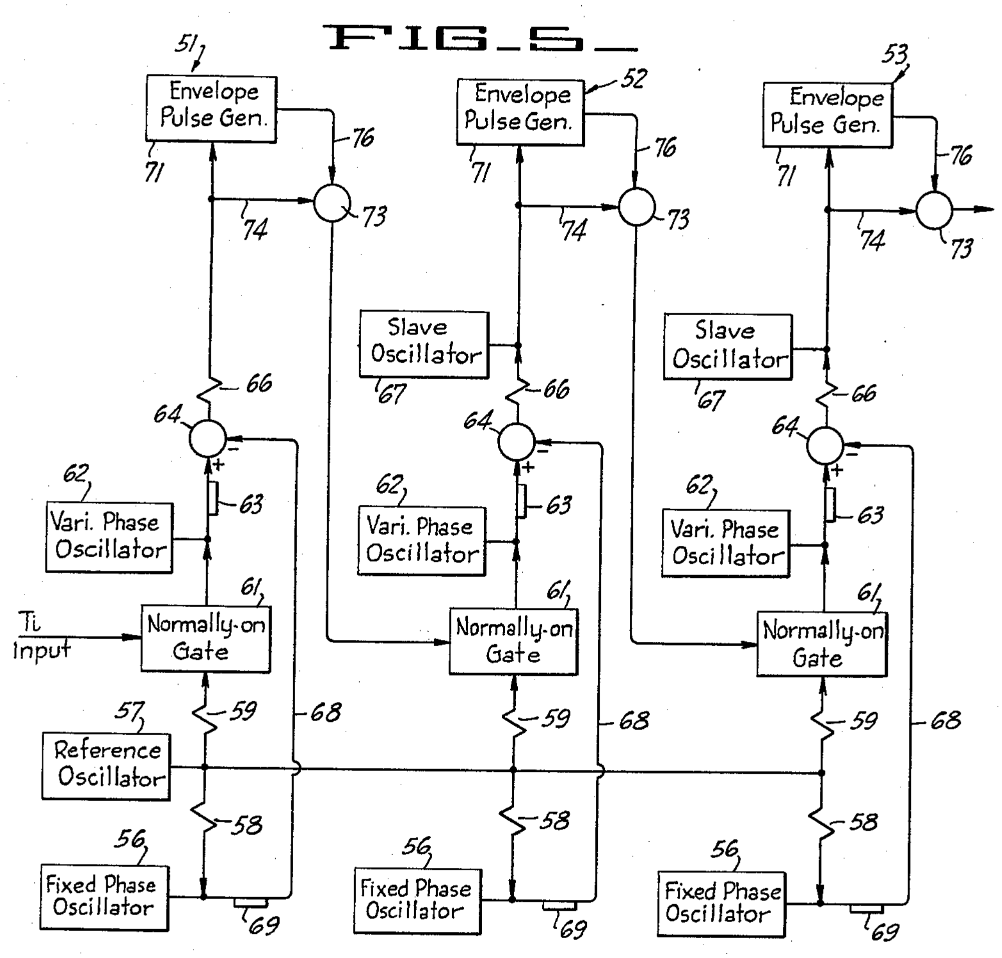
FIGURE 5 is a block diagram of a number storage apparatus utilized as a three-stage phase shift scaler which is suitable for microwave frequencies.

Another embodiment of my invention utilized as a phase shift scaler is shown in FIGURE 5 which is particularly adapted to microwaves. Three separate stages 51, 52 and 53 are shown, each of which may have the same or different scaling ratios as hereinafter described. As shown, each stage is provided with a separate fixed phase oscillator 56. A single reference oscillator 57 is provided for all three stages. However, if desired, separate reference oscillators may be used for each of the stages.

The reference oscillator 57 is coupled to the fixed phase oscillator 56 in each of the stages through a suitable directional coupler 58 such as a ferrite unidirectional coupler which provides attenuation for directional isolation. The frequency of the reference oscillator 57 is injected into the fixed phase oscillators 56 and will cause the fixed phase oscillators to operate in synchronism with the reference oscillator.

The reference oscillator 57 is also coupled through a unidirectional coupler 59 in each of the stages to a normally on or open gate 1 provided in each of the stages. The output of the gate 61 is injected into a variable phase oscillator 62 provided in each of the stages. The output of the variable phase oscillator 62 is injected through a low-pass filter 63 of a type well known to those skilled in the art and into a unilateral connection or adder 64 provided in each of the stages. The adders 64 in each of the stages are connected to a unidirectional coupler 66. In stages 52 and 53 the unidirectional coupler 66 is connected to a variable phase slave oscillator 67. The adders 64 in each of the stages are also connected to the fixed phase oscillators 56 by conductors 68 connected through low-pass filters 69.

The unidirectional coupler 66 in stage 51 is directly connected to an envelope pulse generator 71 which is provided in each of the stages. It may be explained that no slave oscillator has been provided in stage 51 because stage 51 is only a scale 2 as hereinafter described. Whenever a stage is for a scale of 2, the slave oscillator may be omitted and the output from the unidirectional coupler 66 may be fed directly into the envelope pulse generator 71. In stages 52 and 53, the outputs of the slave oscillators 67 are fed into the envelope pulse generators 71.

In each of the stages, the inputs to the envelope pulse generators 71 are connected to the inputs of adders 73 by conductors 74. The outputs of the envelope pulse generators are connected to the adder 73 by a conductor 76. In stage 51, the adder 73 serves to sum the input signal to the envelope pulse generator and the output from the envelope pulse generator. In stages 52 and 53, the adder 73 sums the output signal from the slave oscillator 67 and the output from the envelope pulse generator 71.

The output of the adders 73 in each of the stages feeds into the gate 61 in the succeeding stage. For example, as is shown, the adder 73 in stage 51 feeds into the gate 61 of stage 52.

The circuit diagram hereinbefore described and shown in FIGURE 5 is particularly adapted for use with microwave frequencies. Conventional amplifier type tubes, klystrons or travelling wave tubes may be used in the oscillators, but I prefer to utilize travelling wave tubes because they can be made to change oscillation phase rapidly. The adder 64 can be of any type well known to those skilled in the art such as the magic T type microwave element similar to those described on pages 116 and 117 of the Waveguide Handbook, vol. 10 of the Radiation Laboratory Series published by McGraw-Hill. The filters can also be of a type well known to those skilled in the art such as ones described in Southworth on "Principles and Applications of Waveguide Transmission" published in 1950 by D. van Nostrand Co., Inc., pages 285–319. The low pass filters 63 and 69 can be in the form of a stub tuner inserted in the waveguide to block out, reflect, or short out the high frequency.

Operation of the block diagram shown in FIGURE 5 may now be briefly described as follows: Let it be assumed that it is desired to operate stage 51 at a scale of 2, stage 52 at a scale of 5, and stage 53 at a scale of 10. Let it also be assumed in stage 51 that the fixed phase oscillator 56 is operating at 15 kmc., that the reference oscillator 57 is operating at 30 kmc., and that the variable phase oscillator 62 is operating at approximately 15 kmc. in stage 51.

The input events $T_i$ are applied to the normally open gate 61 of stage 51. During the time the gate is normally open, the frequency of the variable phase oscillator 62 is pulled into synchronism with the reference oscillator 57. However, at the moment a pulse is applied to the gate 61, the gate is closed and the variable phase oscillator is allowed to run free. The free running frequency of the variable phase oscillator is slightly different from 15 kmc. and for that reason, its phase is shifting in relationship to the phase of the fixed phase oscillator 56. It is assumed that the input pulses $T_i$ to the gate 61 are so tailored that the gate 61 is closed or off for a predetermined time interval so that the variable phase oscillator 62 may shift its phase by exactly 180°.

As pointed out previously, the output of the variable phase oscillator 62 feeds into the adder 64 as does the output of the fixed phase oscillator 56. The output of the adder in stage 51, from the two signals applied to the adder, varies between the two values of no signal and full signal, there being no signal in the case when the variable phase oscillator 62 and the fixed phase oscillator 56 are 180° out of phase, and full signal when the signals from the variable phase oscillator and the fixed phase oscillator are exactly in phase.

The initial phase of the variable phase oscillator 62 is chosen so that the full signal output of the adder represents an even count and no signal represents an odd count. During an even count or full signal, the conductor 74 will be carrying one unit of high frequency voltage. Since the envelope pulse generator 71 will have no output under this condition as hereinafter described, the output of the adder 73 will be one unit which is insufficient to close the gate 61 in stage 52. When an odd count arrives, the output from the coupler 66 and the voltage on conductor 74 both drop to zero. At this time the pulse generator 71 in stage 51 delivers a short pulse of reversed phase and unit amplitude which also is insufficient to close the gate 61 of each succeeding stage.

When the next even count arrives, the output from the coupler 66 and the voltage on conductor 74 both return to one unit of high frequency voltage. At this time, the envelope pulse generator 71 in stage 51 delivers a short pulse which is in phase with the voltage on conductor 74. The output of the adder 73, therefore, rises to two units of high frequency voltage which is sufficient to close the gate 61 for the duration of the short pulse from the envelope pulse generator. The envelope pulse generator 71 is a microwave analog of the shorted transmission line 28 shown in FIGURE 3.

The envelope pulse generator, as hereinafter described, produces no output as long as the input to the envelope pulse generator is constant. However, when the input to the envelope pulse generator changes suddenly, the transient within the envelope pulse generator permits the output of the envelope pulse generator to suddenly rise to a finite value until new steady state conditions are again achieved. The output of the envelope pulse generator will, therefore, be a pulse modulated on top of the carrier frequency which will exist for a very short time which is determined by the design of the envelope pulse generator. This short pulse of energy can be used to trigger the normally open gate of the following or succeeding stage and to provide an output count from the first stage.

Figure 6:
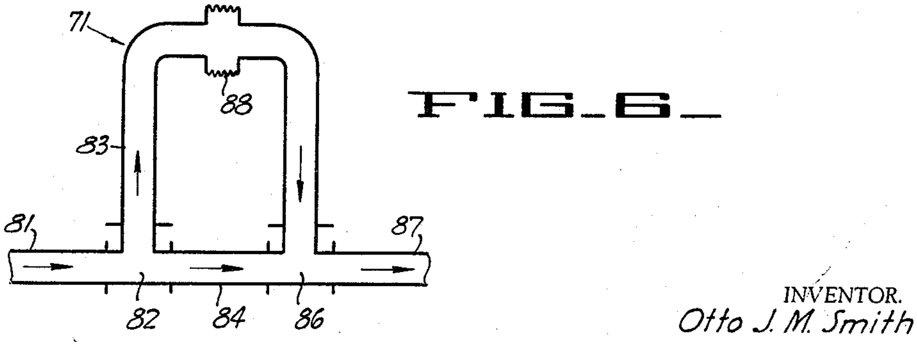
FIGURE 6 is a schematic diagram of an envelope pulse generator suitable for use in the block diagram shown in FIGURE 5.

A schematic diagram of one type of envelope pulse generator is shown in FIGURE 6. The envelope pulse generator shown will be described in terms of a microwave waveguide configuration. The energy enters the pulse generator 71 through a wave guide 81 and arrives at a junction 82 which can be of the magic T type hereinbefore described. The junction 82 serves to transmit equal parts of energy down the wave guides 83 and 84. If desired in place of the magic T junction 82, two separate directional couplers each extracting the same quantity of signal from the wave guide 81 can be utilized.

Wave guide 83 is designed so that it is significantly longer than the wave guide 84 so that it will contain many more oscillations and wave lengths of the microwave carrier frequency. Wave guides 83 and 84 are connected together by another magic T junction 86 which is designed to add the signals from the two wave guides 83 and 84. The magic T junction 86 must be arranged as an adder with a dummy load on one of the output additive arms and the useful load being the wave guide 87 connected to the other output arm. The lengths of the wave guides 83 and 84 are adjusted by a telescoping section 88. The telescoping section 88 is adjusted so that for a steady state input into wave guide 81, the output on wave guide 87 is exactly zero.

Figure 7:
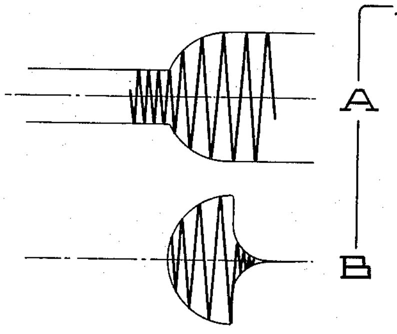
FIGURE 7A represents the step input to the envelope pulse generator and curve 7B represents the step output from the pulse generator.

When a change in the input to the wave guide 81 occurs, the envelope of the oscillation will increase in amplitude as shown in FIGURE 7A. Within a short time, a pulse of the type shown in FIGURE 7B will appear in wave guide 87 which will be a small amount of electromagnetic energy at the resonant frequency which will exist for a length of time equal to the difference in the time of travel in the wave guides 83 and 84.

It will be recalled that in the example given, stage 51 was operated at the scale of 2 which would mean that the variable phase oscillator 62 would have only two stable states. For this reason, the free running frequency of the variable phase oscillator 62 can be significantly different from the predetermined frequency of the fixed phase oscillator which in this case was assumed to be 15 kmc. A deviation of 2 kmc. for the free running frequency is quite reasonable which in this case would be 13 kmc. for the free running frequency as compared with the 15 kmc. frequency when synchronized. With the 2 kmc. deviation when running free, it will take only ¼ of a millimicrosecond for the variable phase oscillator 62 to shift to its new stable phase state. For this amount of frequency deviation, the envelope pulse generator 71 should deliver a pulse which is only ¼ of a millimicrosecond in length. Therefore, the length of the pulse generated by the envelope pulse generator should be determined by the frequency deviation.

The envelope pulse generator 71 for the stage 51 should generate a pulse having an optimum length determined by the frequency deviation and the desired speed of action of the succeeding stage which in this case has been assumed to be the scale of 5. For a scale of 5 and with the frequencies hereinbefore assumed, the length of the pulse generated by the pulse generator 71 of the first stage should be in the order of ⅝ of a millimicrosecond.

The envelope pulse generator hereinbefore described is a phase comparison device. However, this phase comparison device is significantly different from the phase coincidence circuit described in FIGURE 3 because in the present form it is desirable to keep all information in the form of a signal or pulse modulated on top of a microwave frequency. If this signal or pulse should be demodulated, the system might be significantly slowed down. For that reason, the phase comparison means decribed for use in FIGURE 5 is designed to operate completely on a carrier type system.

From the foregoing, since stage 51 operates on the scale of 2, it is apparent that the gate 61 in stage 52 will only be closed on every even pulse received on the input to the gate 61 of stage 51. Since it was assumed that stage 52 operated on a scale of 5, the variable phase oscillator 62, the fixed phase oscillator 56 and the slave oscillator 67 must operate at 6 kmc. Since the variable phase oscillator 62 of stage 52 operates at substantially 6 kmc., and the reference oscillator 57 operates at 30 kmc., there are five stable phase states. The signal leaving the adder 64 in stage 52 has one null condition and two different voltage conditions, corresponding to the four other stable phase states.

Since it was assumed that stage 53 operated at the scale of 10, the variable phase oscillator 62, the fixed phase oscillator 56 and the slave oscillator 67 must operate at 3 kmc. When the normally on gates 61 in each of the stages 52 and 53 are opened, the variable phase oscillators and the slave oscillators 67 operate in synchronism with the reference oscillator 57. As soon as the gates 61 closed, the variable phase oscillators are free running and their phases shift with respect to the phase of the reference oscillator 57. Since the variable phase oscillator 62 operates at substantially 3 kmc. and the reference oscillator 57 at 30 kmc., there are ten stable phase states. The signal leaving the adder 64 of stage 53 has one null condition and five different voltage conditions, corresponding to the nine other stable phase states.

Slave oscillators 67 have been provided in stages 52 and 53 for changing the several amplitude levels from the couplers 66 corresponding to the several different counts, into only two different operating conditions. Each of the slave oscillators 67 is analogous to the diode 23 in FIGURE 3. As pointed out previously, the diode 23 passes a signal when the two input frequencies to the circuit are exactly in phase. In FIGURE 5, the inverse action is utilized. When the outputs of the variable phase oscillators 62 and the fixed phase oscillators 56 are exactly in phase, the minimum null signal is obtained rather than a maximum signal and this null signal is used to release the slave oscillator 67 from its synchronized frequency to allow its oscillations to die. When the slave oscillator commences oscillation again, and applies a voltage to the envelope pulse generator 71, this step change in voltage is converted into a pulse by the envelope pulse generator 71 and energy in the form of high frequency is injected into the gate of the succeeding stage to trigger it to the off or closed position.

The slave oscillators 67 can also be called saturating amplifiers because they are adjusted to be on the verge of oscillation so that they do not oscillate and deliver no voltage for the condition of no output from the adders 64. For all other conditions when the adders deliver an output, regardless of the amplitude of the voltage, the slave oscillators 67 oscillate synchronously with the reference oscillator at a constant voltage.

The phase state immediately after or following the null condition in each of the couplers 66 is chosen for the zero count. As the phase and amplitude of the voltage in each of the couplers 66 vary, there is variation in only the phase of the voltage entering the pulse generator 71 and the conductor 74 to the adder 73. The output of the adder 73 for the first few counts after zero is negligibly small. This situation continues until the next to the last count of the stage when the voltage in the coupler 66 drops to zero and the slave oscillator 67 ceases oscillations. The pulse generator 71 then delivers a small pulse, but not sufficient to close gate 61 of the succeeding stage.

When the variable phase oscillator 62 receives the pulse which resets it to the zero count condition, the coupler 66 passes a voltage, the slave oscillator 67 commences oscillations, and the envelope pulse generator 71 delivers a large pulse sufficient to open the gate 61 in the succeeding stage for the duration of the pulse.

The gates 61 shown in FIGURE 5 can be of any suitable type. For example, diodes similar to that described in FIGURE 3 may be utilized provided the diodes are adapted for high frequency microwaves. However, I have found it desirable to utilize travelling wave tubes or klystrons. For example, if a reflex klystron is utilized in stage 51, it is tuned to deliver 30 kmc. The output of this reflex klystron would then be the same as the output of the reference oscillator 57. It would be synchronized with the reference frequency by virtue of the injection of a small amount of the 30 kmc. frequency from the reference oscillator 57 after having passed through the unidirectional coupler 59.

When an impulse $T_1$ is received by the gate 61 of the type hereinbefore described, the pulse would be converted into a voltage which could be applied to the reflector plate of the reflex klystron, de-tuning it sufficiently so that it would no longer oscillate at 30 kmc. and would no longer deliver the required synchronizing voltages to the variable phase oscillator 62. As soon as the input trigger pulse has been dissipated, the gate klystron will build up its amplitude of oscillation, synchronizing automatically with the small quantity of 30 kmc. frequency voltage injected into it. The amplitude of the signal injected into the gate klystron is so chosen that the signal is insufficient to be passed on to the variable phase oscillator 62 when the gate is off or closed. When the gate is on or open, the gate klystron output would be sufficient to synchronize the variable phase oscillator 62. The gates in the succeeding stages operate in a similar manner.

If a phase shift scaler were built and operated under the hereinbefore assumed conditions which are listed below, the following counting rates could be obtained:

| Stage | Scale | Synchronizing frequency, kmc. | Variable phase oscillator, kmc. | Fixed phase oscillator reference, kmc. | Slave oscillator, kmc. | Counting rate in mc. | |
|---|---|---|---|---|---|---|---|
| | | | | | | Maximum theoretical | Practical rating |
| 51 | 2 | 30 | 15 | 15 | -------- | 5,000 | 1,000 |
| 52 | 5 | 30 | 6 | 6 | 6 | 2,000 | 500 |
| 53 | 10 | 30 | 3 | 3 | 3 | 1,000 | 100 |
| Additional stage | 10 | 30 | 3 | 3 | 3 | 1,000 | 10 |
| Do | 10 | 30 | 3 | 3 | 3 | 1,000 | 1 |

Thus with the scaling ratios given in the above chart, a total scaling ratio of $10^4$ could be obtained as shown in the chart below. Thus, with an input of 1 kmc., the output would be 100 kc. and for such a scaling ratio only 13 oscillators would be required. Information is also given in the chart below for scaling ratios of $10^3$ and $10^2$.

| Total Scale | $10^2$ | $10^4$ | $10^3$. |
|---|---|---|---|
| Input | 1 kmc. | 1 kmc. | 100 mc. |
| Output | 10 mc. | 100 kc. | 100 kc. |
| Oscillators | 9 | 13 | 8. |

Figure 8:
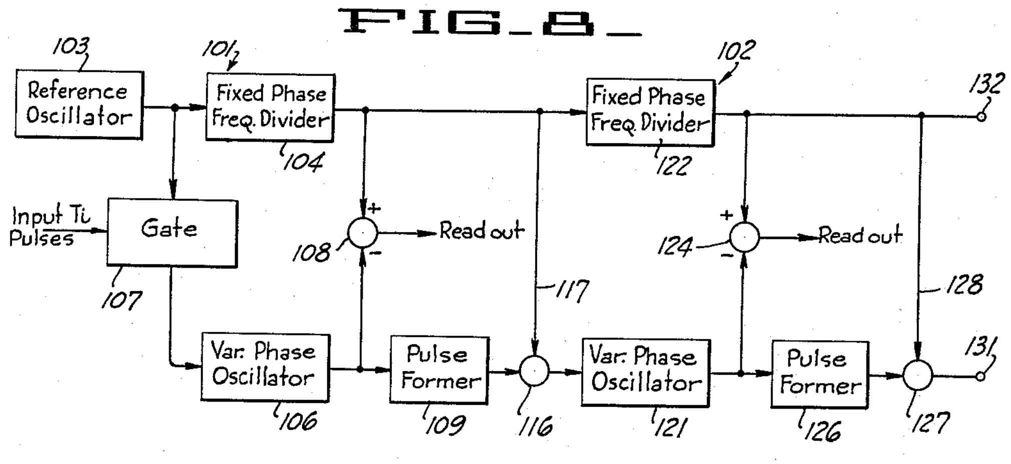
FIGURE 8 is a block diagram of another embodiment of my number storage apparatus utilized as a phase shift scaler.

Another embodiment of my invention utilized as a phase shift scaler is shown in FIGURE 8 which is also particularly adapted for microwaves. As shown in block form, two stages 101 and 102 are provided, each of which may have the same or different scaling ratios as hereinafter described.

As shown in the block diagram in FIGURE 8, a high frequency reference oscillator 103 provides a synchronizing signal to a fixed phase frequency divider 104 and a variable phase oscillator 106 which form a part of stage 101. The synchronizing signal to the variable phase oscillator 106 is fed through a gate 107. The outputs of the fixed phase frequency divider 104 and the variable phase oscillator 106 feed into an adder 108 which may be converted to a suitable readout device as hereinafter described.

The fixed phase frequency divider is actually a fixed frequency oscillator and can be of a type well known to those skilled in the art such as the frequency divider disclosed in United States Letters Patent No. 2,418,568. However, the fixed frequency oscillator is called a fixed phase frequency divider because it need not be a normal oscillator but can be a device which delivers an output which is exactly equal to some fraction of the input supplied to it by the reference oscillator 103.

The variable phase oscillator 106 is also tuned to some fraction of the reference oscillator frequency, the fraction being preferably the same as the fraction utilized by the fixed phase frequency divider 104. For example, if the reference oscillator were operated at 20 kmc., the frequency divider 104 would be operated at 2 kmc., and the variable phase oscillator 106 would be tuned to 2 kmc. to provide a scale of 10 for stage 101.

The variable phase oscillator 106 is de-tuned slightly so that its normal free running frequency is slightly less than the synchronized frequency and, therefore, loses phase with respect to the phase of the synchronizing frequency. The amount of de-tuning is chosen as in the other embodiments of my invention to produce the maximum rate of phase change when the synchronizing voltage is removed by closing of the gate 107. For a scale of 10, as hereinbefore assumed for stage 101, approximately 2½% frequency de-tuning is desirable.

The gate 107 can be of the type which is merely closed by the input pulses $T_1$, or of the type which is completely controlled by the input pulses $T_1$. If the gate need merely be closed by the input pulses, a one-shot multivibrator may be utilized for very low frequencies. However, if the gate 107 is to be completely controlled by the input pulses, that is the length of time the gate is closed is controlled by the input pulses, then the input pulses must be tailored as hereinbefore described for the other embodiments of my invention. For high frequencies, the gate 107 can be a klystron or a traveling wave tube. In a klystron the input could be used to control the beam density and the radio frequency to be gated could come in on one resonator or grid structure and be taken off from another resonator or grid structure. In a traveling wave tube the input could be used for controlling the beam and the radio frequency to be gated could be injected on the spiral and taken off at the end of the spiral.

In tailoring the pulses, the waveform of the input pulses must be adjusted so that for each count the pulse length lies within the range necessary for the variable phase oscillator to shift by one count. As hereinbefore explained, the length of the pulse which the gate must deliver under such conditions should be approximately four full cycles of the variable phase oscillator frequency which, for example, with a scale of 10 assumed for stage 101 would be 40 cycles of the 20 kmc. frequency. The range of pulse length which will still operate satisfactorily is from one-half of this value to 1½ times this value, that is, from 2 to 6 cycles of the variable phase oscillator, the variable phase oscillator will count one count. Less than 2 cycles it will miss the count, and more than 6 cycles, it will count 2 counts.

The input pulses $T_1$ are counted by causing them to operate the gate 107 which removes the synchronizing signal from the variable phase oscillator 106 for a length of time sufficient for the variable phase oscillator to reach its new phase state corresponding to one count. With a scale of 10 as hereinbefore assumed, this means a time sufficient for the phase of the variable phase oscillator 106 to shift 36° with respect to the phase reference oscillator 103. At this time the gate 107 will automatically open, introducing a synchronizing voltage to the variable phase oscillator and pulling it into synchronism with the reference oscillator. The variable phase oscillator 106 is then ready for another input pulse to be counted.

With a scale of 10, the variable phase oscillator 106 would have 10 stable phase states. The number of counts which the variable phase oscillator has received from the gate 107 can be measured by taking the voltage difference between the variable phase oscillator 106 and the fixed phase frequency divider 104. This voltage difference will have a variety of values depending upon the relative phases of the two radio frequency voltages. If for one condition the two voltages are exactly in phase, there will be another condition in which they are exactly out of phase, and then there will be three other voltage values, each of these corresponding to two different counts.

In order to remove the ambiguity, the reference phase can be shifted by a small amount, for example 6°, and then there will be provided by the adder 108 ten different voltage values for the differences between the fixed phase and variable phase voltages corresponding to the ten stable states of the variable phase oscillator. Thus, there will be ten different unique output voltages due to either the sum or the difference of the fixed phase voltage and the variable phase voltage. These ten different voltages obtained from the adder 108 can be indicated on a suitable read-out device such as a vacuum tube voltmeter or a rectifier meter and can be assigned the counts of 0 to 9 or 1 to 10.

In order to trigger the next succeeding stage which is stage 102, it is necessary to pick one particular phase state of the variable phase oscillator 106 which will be called the ten or the zero count of the variable phase oscillator and then to utilize this phase state to pass a single pulse to the succeeding stage.

With the scale of ten assumed for stage 101, one pulse would be applied to the stage 102 for every ten input pulses $T_1$.

The first step in tailoring the trigger pulse for the succeeding stage 102 is to differentiate the envelope of the oscillations of the variable phase oscillator with a suitable envelope pulse former 109 such as one similar to that shown in FIGURE 6. In this particular embodiment of my invention the amplitude of the voltage on the input to the envelope pulse generator is absolutely constant and only the phase of the voltage changes in sudden jumps or steps.

Figure 9:
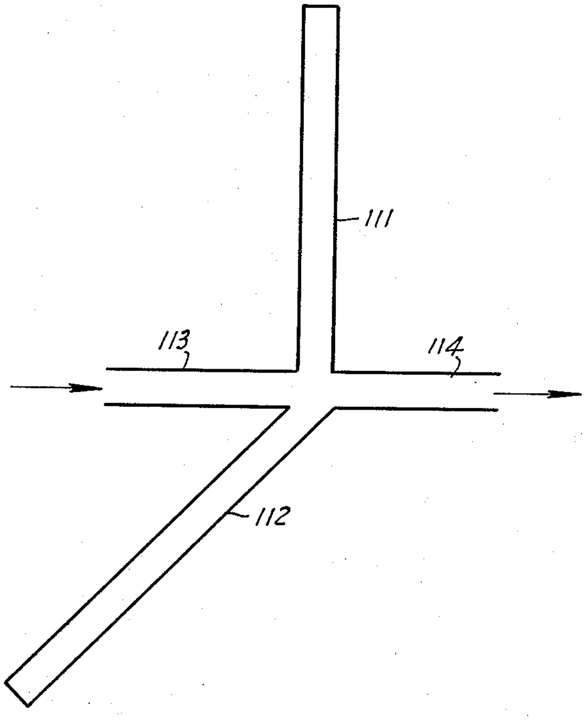
FIGURE 9 is a schematic diagram of a pulse former suitable for use in the block diagram of FIGURE 8.

For each or every steady state condition of the input voltage to the pulse former, the pulse former will deliver no voltage at its output but for each change in the input voltage to the pulse former the pulse former will deliver a voltage equal to the difference between the new steady state vector and the old steady state vector. This change in voltage will appear at the output of the pulse former for a time equal to the time it takes the pulse former to return to its steady state null position. This time is controllable. For example, if a pulse former of a magic T such as shown schematically in FIGURE 9 is utilized, the time can be controlled by choosing the lengths of the shorted wave guides forming arms 111 of the magic T. The magic T as shown also consists of an input arm and an output arm. The magic T is adjusted so that on a steady state input, the magic T is normally nulled and with no voltage output.

If a shorted transmission line of the type hereinbefore described is utilized for a pulse former, the length of time for which the voltage will appear at the output will be equal to twice the length of time of transmission of the signal from one end to the other end of the transmission line.

The net result of the operation of the pulse former 109 by the input pulses $T_1$ is that there will be one short pulse of radio frequency voltage delivered for each change in state of the variable phase oscillator 106 caused by the input $T_1$. These ten different radio frequency pulses which come out of the pulse former 109 for ten counts will have ten different instantaneous phases, each displaced 36° from the previous phase.

One particular pulse from the pulse former must be chosen to trigger or to pass information to the succeeding stage 102. To select one particular pulse, the ten successive phase states of these pulses are fed into an adder 116. The output of the fixed phase frequency divider 104 is also fed into the adder 116 through conductor 117. Thus, the adder 116 serves to sum the ten instantaneous phase states of the pulses and the fixed phase output from the fixed phase frequency divider and when instantaneous pulse voltage is equal in magnitude and opposite in phase to the constant voltage from the frequency divider, there will be one pulse condition which corresponds to zero voltage at the synchronizing position.

The particular phase of the particular pulse chosen for triggering the succeeding stage is cancelled out exactly by a small amount of voltage taken from the fixed phase frequency divider 104. By selecting the appropriate phase of the fixed phase voltage and the instantaneous voltage existing in one of the pulses from the output of the pulse former, the sum of the two voltages can be made to be exactly zero because the frequencies are the same. This zero voltage condition will exist only for a time equal to the length of the pulse. This length of time can be utilized for triggering the succeeding variable phase oscillator 121 in stage 102. At the time of this zero voltage condition, no signal is received from the fixed phase frequency divider 104 and for that reason the variable phase oscillator 121 will operate at its free running frequency and will change its phase.

The variable phase oscillator 121 is normally held in synchronism by the combination of the voltage from the fixed phase frequency divider 104 of stage 101 and the output of the pulse former 109. In the absence of pulses from the pulse former 109, the variable phase oscillator will have an absolutely constant input phase, but during each of the pulses the sum of the pulse voltage and the fixed phase voltage will be a resultant voltage which will have both a different magnitude and a different phase. For example, when the two are in phase, the voltage will jump to two units whereas previously it has been one unit. When the voltages are 120° out of phase, the sum of the two vectors will still be unity but the phase will have shifted by 60° of the frequency of the fixed phase frequency divider in stage 101 which is equivalent to only 6° of the frequency of the fixed phase frequency divider 122 of the stage 102.

It can be seen, therefore, that during the time the various pulses are being received from the pulse former 109 there will be a small tendency for the variable phase oscillator 121 to change the phase of its oscillations. However, the amount of this change is relatively small, being at the most 6°, whereas the amount of phase change representing the count is 36° or ten times as much.

The fixed phase frequency divider 122 is synchronized with the output of the fixed phase frequency divider 104 for stage 101. If, as assumed previously, the output of the fixed phase frequency divider 104 is 2 kmc., the input to the frequency divider 122 will be 2 kmc. Then, if the frequency divider 122 is operating on the scale of 10, the output from the frequency divider will be 200 mc. which is the same as the output of the variable phase oscillator 121, if it is assumed that the variable phase oscillator 121 is operating at $\frac{1}{10}$ of the frequency of the variable phase oscillator 106.

As previously explained, the variable phase oscillator 121 will be solidly synchronized with the 2 kmc. output from the fixed phase frequency divider 104 except during the ten pulses which are delivered by the pulse former. During 9 of the 10 pulses, the variable phase oscillator will not lose synchronism but will shift its phase momentarily by a small amount. As hereinbefore described, the total amount of phase change during a short pulse output from the pulse former 109 would at most be 6° of the 200 mc. oscillation. However, on the tenth pulse from the pulse former, the 2 kmc. synchronizing voltage is exactly cancelled out and dropped to zero, and the 200 mc. variable phase oscillator will lose synchronism and drop back in phase during the time of this pulse. The pulse length and the free running frequency of the variable phase oscillator 121 is so chosen that the total phase change during this free running period is 36° of the 200 mc. wave.

The remainder of the components in stage 2 and the operation of these components in stage 2 are similar to that described in stage 1. As shown, stage 2 includes an adder 124 which gives the sum or the differences of the voltages between the output from the fixed phase frequency divider 122 and the output from the variable phase oscillator 121. The output of the adder 124 is supplied to suitable readout means of the type hereinbefore described.

In order to trigger a third or succeeding stage, a pulse former 126 is provided which differentiates the output of the variable phase oscillator 121. The significant changes in the phases of the oscillator 121 are the sudden phase changes of 36° which occur for each count input into the variable phase oscillator 121. These significant phase changes will produce ten different pulses at the output of the pulse former 126, each pulse having a different phase value, separated by 36° of the 200 mc. wave. These ten phases of pulses are fed into an adder 127 into which also is fed the output from the fixed phase frequency divider 122 by a conductor 128 which in this instance would be a single voltage having a frequency of 200 mc. As hereinbefore described, for one out of every ten pulses from the pulse former 126, the output voltage from the adder 127 drops to zero for the duration of the pulse. Thus, if terminal 131 is connected to a variable phase oscillator of a succeeding stage and terminal 132 is connected to a fixed phase frequency divider of a succeeding stage, this drop to zero voltage in the adder 127 can be used to trigger the succeeding stage.

It is apparent from the foregoing that the embodiment of my phase shift scaler shown in FIGURE 8 has several important advantages. In particular, no non-linearity of any type is required except for the synchronizing characteristic of each of the variable phase oscillators. No gate circuits are required except in the input of the scaler, nor are any clipping devices required. The scaler has symmetry, that is, each stage has two oscillators which can be identical in nature, one being synchronized continuously with the previous stage and one losing synchronism once for each count from the previous stage and delivering a suitable pulse once for each ten counts of the previous stage.

In the embodiment of my invention shown in FIGURE 8, a very high frequency oscillator was utilized and the fixed phase voltages of lower frequency were derived by the use of frequency dividers. It is, however, within the scope of my invention to utilize a very low frequency oscillator and then deriving the fixed phase voltages required in each stage by the use of frequency multipliers such as frequency multipliers generating ten times the frequency at their input.

The embodiments of my invention hereinbefore described have been particularly adapted for use as phase shift scalers. However, as also hereinbefore described, a scaler is but one special application of a number storage apparatus which may also be utilized to perform the function of a number register or number storage device.

Figure 10:
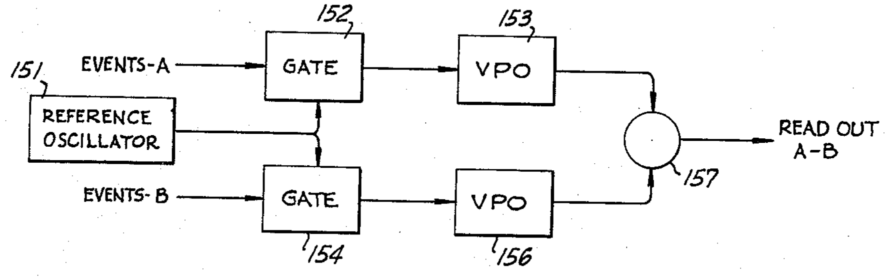
FIGURE 10 is a block diagram of another embodiment of my number storage apparatus which can be used for adding or subtracting.

One embodiment of my invention utilizing such a device for adding or subtracting is shown in the block diagram in FIGURE 10. In FIGURE 10 I have shown a reference oscillator 151 which may be similar to the reference oscillator 103 in FIGURE 8. The reference oscillator feeds into gates 152 and 154 which may be similar to the gate 107 shown in FIGURE 8. The gate 152 feeds into a variable phase oscillator 153 which may be similar to the variable phase oscillator 106 shown in FIGURE 8. The output of gate 154 is fed into a variable phase oscillator 156 similar to variable phase oscillator 153. The outputs of the two variable phase oscillators 153 and 156 are fed into a conventional adder 157 to provide a read-out.

The adder 157 actually reads the difference between the outputs of the two variable phase oscillators 153 and 156 which are operating at the same frequency. The input events or pulses A to the variable phase oscillator 153 will appear as added in the read-out whereas the input pulses or events B to the variable phase oscillator 156 will appear as subtracted in the read-out.

Figure 11:
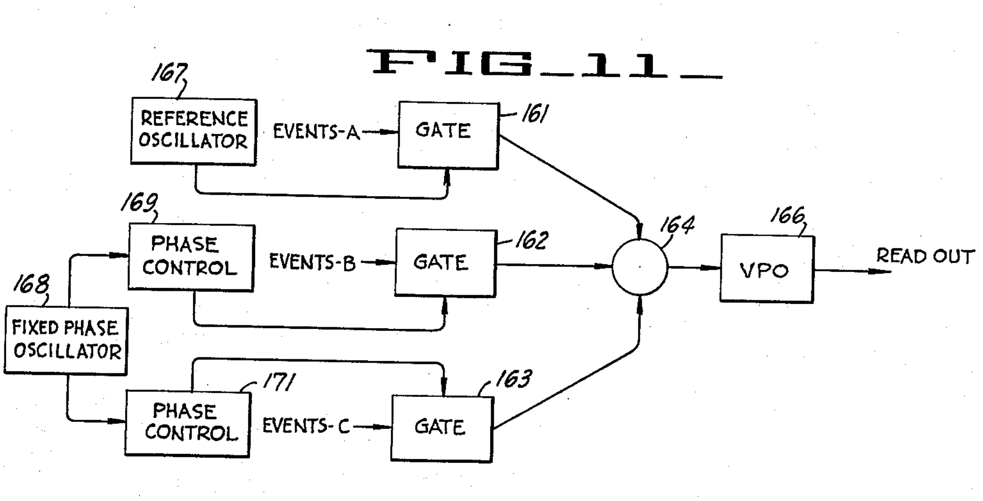
FIGURE 11 is a block diagram of another embodiment of my number storage apparatus in which numbers can be stored.

Another embodiment of my number storage apparatus is shown in the block diagram in FIGURE 11 and consists of a plurality of gates 161, 162 and 163 which are similar to the gates 107 as shown in FIGURE 8. The outputs of the gates feed into an adder 164 which has its output connected to a single variable phase oscillator 166. The three signal adder 164 is of a type well known to those skilled in the art such as those shown in "Theory of Servo Mechanisms" by James, Nichols and Phillips, volume 25 of the Radiation Laboratories Series, published by McGraw-Hill Book Company on page 95, paragraph 3–8 in FIGURE 311 and in "Radio Engineering" (Third Edition) by F. E. Terman, published by McGraw-Hill Book Company on page 141 in FIGURE 4–50, and in "Electrical Communication" by A. L. Albert, published in 1934 by John Wylie and Sons on pages 375–377. The synchronizing frequency for the first gate 161 is derived from a reference oscillator 167. The synchronizing frequency for the second gate is derived from a fixed phase oscillator 168 through a phase control device 169. The synchronizing frequency for the gate 163 is derived from the same fixed phase oscillator 168 through a different phase control device 171. The phase control device 169 is of a type well known to those skilled in the art such as those shown in "Electronic Instruments" by Holdum and Macrey, volume 21 of the Radiation Laboratory Series, published by McGraw-Hill Book Company, Inc. in 1948, on pages 210–212 in paragraphs 38 and 39 of section 3, chapter 5 and in "Electrical Engineering" by Jones, published by John Wylie and Sons in 1957 on page 242, FIGURES 8–11 in chapter 8, section 9. The variable phase oscillator 166 is tuned so that its free running frequency is identical to the output of the fixed phase oscillator 168.

Now let it be assumed that the first gate 161 is normally open and the second and third gates 162 and 163 are normally closed. Closing of the gate 161 and opening of the gate 162 simultaneously will cause the variable phase oscillator 166 to shift to a predetermined phase state representing a particular number at the read-out. The variable phase oscillator 166 will maintain this number after the gate 161 has been opened and the second gate has been closed. The value of the number which is stored in the variable phase oscillator 166 is independent of the length of time during which the gates were operated assuming that the time is greater than some minimum operating time for the gates. Similarly, closing the gate 161 and opening the gate 163 simultaneously will cause the oscillator 166 to change to a different predetermined phase state representing a different particular number.

It is readily apparent that such a device has applications as a number register in a digital computer.

Figure 12:
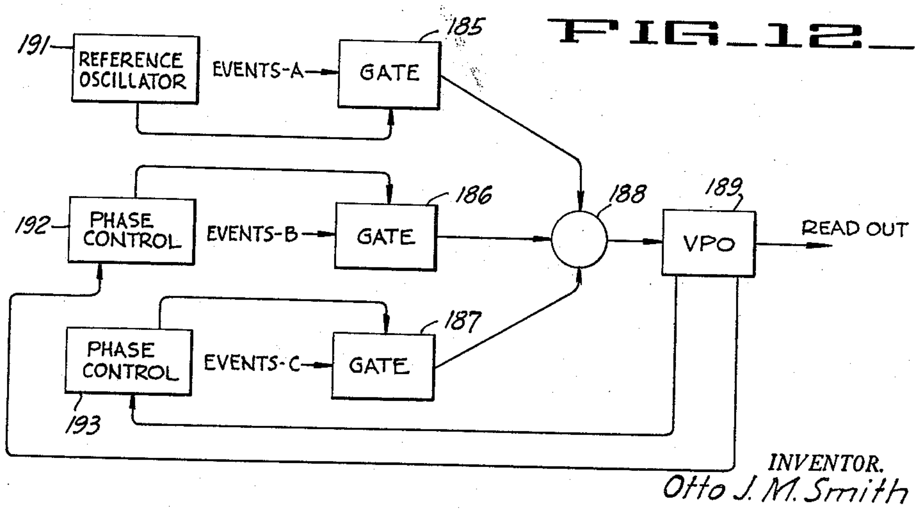
FIGURE 12 is a block diagram of another embodiment of my number storage apparatus in which counts can be added or subtracted.

In FIGURE 12 I have shown in block diagram form another embodiment of my number storage apparatus. In this embodiment a plurality of gates 185, 186 and 187 is provided similar to gates shown in FIGURE 11. The outputs of the gates feed into an adder 188 (similar to adder 164 of FIGURE 11) whose output feeds into a variable phase oscillator 189. The synchronizing frequency for the first gate 185 is obtained from a reference oscillator 191. The synchronizing frequency for the second gate 186 is derived from the output of the variable phase oscillator 189 through a phase control device 192. The synchronizing frequency for the third gate 187 is derived from the output of the same variable phase oscillator 189 through a different phase control device 193. The phase control devices 192 and 193 are similar to the phase control devices 169 and 171 of FIGURE 11. The output of the variable phase oscillator 189 is tuned so that its free running frequency is synchronized to the output of the reference oscillator 191.

Now let it be assumed that the gate 185 is normally open and that the gates 186 and 187 are normally closed. When the gate 185 is closed and the gate 186 is opened simultaneously for a predetermined length of time, the variable phase oscillator 189 will change its phase in accordance with the phase shift introduced from its own output, this phase state change being a predetermined increment which can represent the addition of one count. Similarly, closing the gate 185 and opening the gate 187 simultaneously for a predetermined length of time will cause the variable phase oscillator 189 to change its phase state by a different predetermined increment which can represent the subtraction of one count.

It is readily apparent that such an arrangement also has applications as a number register in a digital computer.

It is apparent from the foregoing that the number storage apparatus and method as hereinbefore described are adapted for use with low and high frequencies and that the apparatus can be used for number storing, frequency scaling, counting and the like.

I claim:

1. In apparatus of the character described, a plurality of stages, means connecting said stages in cascade, each of said stages comprising a fixed phase source operating at a predetermined frequency, a variable phase oscillator adjustable to provide a free running frequency substantially different from said predetermined frequency, a source of synchronizing frequency harmonically related to said predetermined frequency, means for injecting the synchronizing frequency into said variable phase oscillator to cause said variable phase oscillator to operate in synchronism at said predetermined frequency, means responsive to input events or signals for removing the synchronizing frequency, and means for indicating when the output of the variable phase oscillator has a predetermined phase relationship to the output of the fixed phase source to apply a signal or input event to the next stage.

2. An apparatus as in claim 1 wherein the same fixed phase source is utilized for all stages.

3. An apparatus as in claim 1 wherein said means for injecting a synchronizing frequency harmonically related to said predetermined frequency includes a reference oscillator.

4. An apparatus as in claim 3 in which the same reference oscillator is used for all stages.

5. An apparatus as in claim 4 in which the same fixed phase source is utilized for all stages.

6. An apparatus as in claim 4 in which the fixed phase source has a different frequency for each stage.

7. An apparatus as in claim 1 in which the fixed phase source in each succeeding stage is derived by frequency multiplication or division from the fixed phase source of the preceding stage.

8. In apparatus of the character described, a fixed phase oscillator operating at a predetermined frequency, means for generating a synchronizing frequency harmonically related to said predetermined frequency, an electronic gate responsive to input events, the synchronizing frequency being fed through said gate, a variable phase oscillator fed by said gate, said variable phase oscillator operating at the predetermined frequency when said gate is open and operating at a frequency different from the predetermined frequency when said gate is closed, and means for indicating the phase relationship between the outputs of the fixed phase oscillator and the variable phase oscillator.

9. In a system of the character described, means for producing control pulses of predetermined time duration responsive to input events, a source of reference frequency, a source of comparison frequency, means for adjusting the reference frequencey to a multiple of the comparison frequency, a variable phase oscillator, and means responsive to said control pulses for applying said reference frequency to said variable phase oscillator and for removing the reference frequency from said variable phase oscillator, said variable phase oscillator generating a frequency equal to the comparison frequency in the absence of a control pulse and generating a frequency different from the comparison frequency in the presence of a control pulse, the generated frequency of the variable phase oscillator having at least two different possible phases with respect to the comparison frequency.

10. In a number storage system, means for producing control pulses of predetermined time duration responsive to input events, gate means responsive to said control pulses, said gate means being open and providing a transmission channel in the absence of a control pulse, a source of reference frequency connected to the gate means, a source of comparison frequency, means for adjusting the reference frequency to a multiple of the comparison frequency, a variable phase oscillator connected to the gate means and having a free running frequency different from the comparison frequency, said variable phase oscillator being synchronized to a submultiple of the reference frequency when the gate means is open, means for adjusting the free running frequency of the variable phase oscillator to vary the rate of change of phase of the variable phase oscillator with that of the comparison frequency during the time a control pulse is applied to the gate means, and means for measuring the phase change between the variable phase oscillator and the comparison frequency.

11. In a system of the character described, gate means having input, output and control ports, means connected to the control port of the gate means for producing control pulses of predetermined time duration responsive to input events, a source of reference frequency connected to the input port of the gate means, a source of comparison frequency, means for synchronizing the reference source to the comparison source so that the frequency of the reference source is a multiple of the comparison frequency, a variable phase oscillator connected to the output port of the gate means, said gate means delivering the reference frequency to the variable phase oscillator when the gate is open, said variable phase oscillator being brought into synchronism with the reference frequency and having a frequency which is equal to the comparison frequency when the gate means is open, and means for adjusting the frequency of the variable phase oscillator to a frequency which is different from the comparison frequency when the gate is closed.

12. In a number storage apparatus, gate means responsive to input events, a fixed phase oscillator operating at a frequency of $f$, a reference oscillator connected to the gate, means for synchronizing the frequency of the reference oscillator with the frequency of the fixed phase oscillator so that the reference oscillator has a frequency of $nf$, a variable phase oscillator fed by said gate, said variable phase oscillator operating at a frequency of $f$ when the gate is open and operating approximately at a frequency of $f(1-\frac{1}{3}n)$ when the gate is closed, and means for indicating the phase relationship between the outputs of the fixed phase oscillator and the variable phase oscillator.

13. In apparatus of the character described, an oscillator operating at a predetermined frequency, a variable phase oscillator, means for injecting a synchronizing frequency into said variable phase oscillator to cause said variable phase oscillator to operate in synchronism at said predetermined frequency and for removing the synchronizing frequency responsible to input events, said variable phase oscillator being adjustable to provide a free running frequency which differs substantially from the synchronizing frequency, and means for indicating when the output of the variable phase oscillator has a predetermined phase relationship to the output of the first named oscillator.

14. Apparatus as in claim 13 wherein the indicating means includes means which only delivers a voltage for a short predetermined time.

15. Apparatus as in claim 13 wherein indicating means includes means which delivers a short pulse of radio frequency energy.

16. Apparatus as in claim 13 wherein the indicating means includes means in which a change in radio frequency voltage produces a short pulse of radio frequency voltage.

17. Apparatus as in claim 13 wherein the indicating means is responsive to changes in phase.

18. Apparatus as in claim 13 together with readout phase comparison means for delivering a sequence of voltages which are a function of the difference in phase between the variable phase and the first named oscillators.

19. Apparatus as in claim 13 wherein said synchronizing frequency is harmonically related to said predetermined frequency and wherein the harmonic relationship between the synchronizing frequency and the predetermined frequency determines the number of stable states, the number of stable states being equal to the ratio of the synchronizing frequency to the predetermined frequency.

20. In apparatus of the character described, means for producing control pulses of predetermined time duration responsive to input events, first and second oscillators, means for producing a synchronizing signal, means responsive to the control pulses and being capable of assuming at least two conditions, said last named means in one condition applying said synchronizing signal to one of said oscillators to cause said one oscillator to operate at a predetermined frequency, said last named means in another condition permitting said one oscillator to operate at a frequency different from said predetermined frequency in accordance with the lengths of said control pulses and means for indicating the phase relationship between the output of said first oscillator and the output of said second oscillator.

21. Apparatus as in claim 20 wherein the other of said oscillators is a fixed phase oscillator.

22. In apparatus of the character described, a first oscillator operating at a first predetermined frequency, a second oscillator, means for producing control pulses of a predetermined length responsive to input events, means for producing a synchronizing signal, gate means responsive to the control pulses and being capable of assuming at least two conditions, said gate means in one condition permitting the synchronizing signal to be applied to said second oscillator to cause it to operate at a second predetermined frequency, said gate means in another condition permitting said second oscillator to operate at a preselected frequency different from said second predetermined frequency in response to said control pulses for predetermined lengths of time, and means for indicating the phase relationship between the output of the first oscillator and the output of the second oscillator.

23. Apparatus as in claim 20 wherein said first oscillator is a fixed phase oscillator and wherein said one oscillator is said second oscillator.

24. In apparatus of the character described, a plurality of stages, means connecting said stages in cascade, each of said stages comprising first and second oscillators, means for producing control pulses of a predetermined length in response to input events, means for producing a synchronizing signal, means responsive to the control pulses and being capable of assuming at least two conditions, said last named means in one condition applying said synchronizing signal to one of said oscillators to cause said one oscillator to operate at a predetermined frequency, said last named means in another condition permitting said one oscillator to operate at a preselected frequency different from said predetermined frequency for a predetermined length of time longer than one period of oscillation of said one oscillator in accordance with said control pulses, and means for indicating the phase relationship between the output of said first oscillator and the second oscillator.

25. Apparatus as in claim 24 wherein the same fixed phase oscillator is used for all the stages.

26. Apparatus as in claim 25 wherein the means for producing a synchronizing signal is used for all of the stages.

27. An information storage system comprising a source of a periodic synchronizing signal, first and second oscillator circuits coupled to said source of synchronizing signal, said oscillator circuits each being constructed and arranged to operate at a frequency which is equal to $1/n$ times the repetition rate of said synchronizing signal, where $n$ is an integer greater than one and is the same for each oscillator circuit, each of said oscillator circuits being further constructed and arranged to maintain a preselected phase relationship between the oscillations generated thereby and said periodic synchronizing signal, means associated with said first and second oscillator circuits for initially establishing a preselected phase relationship between the signals generated by said first and second oscillator circuits, at least one of said oscillator circuits being a tuned oscillator circuit, and a source of input signals coupled to said tuned oscillator circuit for shifting the phase of oscillation of said tuned oscillator circuit by $a/n$ cycles of said oscillation for each of said input signals, where $a$ is an integer less than $n$, said input signals being representative of the information to be stored.

28. An impulse counter circuit in accordance with claim 27, said counter circuit further comprising means associated with said first and second oscillator circuits for indicating the relative phases of the signals generated thereby.

References Cited in the file of this patent

UNITED STATES PATENTS

| | | |
|---|---|---|
| 2,199,189 | Scheldorf | Apr. 30, 1940 |
| 2,510,485 | Vossberg | June 6, 1950 |
| 2,580,740 | Dickinson | Jan. 1, 1952 |
| 2,582,957 | Borsum et al. | Jan. 22, 1952 |
| 2,595,263 | Ingalls | May 6, 1952 |
| 2,939,081 | Dennis | May 31, 1960 |

OTHER REFERENCES

Measuring Phase at R–F and Video Frequencies, by V. P. Yu, from Electronics, January 1956, pages 138–140.